(12) United States Patent
Cho et al.

(10) Patent No.: US 9,167,132 B2
(45) Date of Patent: Oct. 20, 2015

(54) SYSTEM AND METHOD OF ESTIMATING MOTION OF IMAGE USING BLOCK SAMPLING

(75) Inventors: Yang Ho Cho, Gyeonggi-do (KR); Ho Young Lee, Gyeonggi-do (KR); Du-Sik Park, Gyeonggi-do (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 1210 days.

(21) Appl. No.: 12/056,793

(22) Filed: Mar. 27, 2008

(65) Prior Publication Data

US 2009/0097562 A1 Apr. 16, 2009

(30) Foreign Application Priority Data

Oct. 12, 2007 (KR) .................. 10-2007-0103196

(51) Int. Cl.
 *H04N 5/14* (2006.01)
 *H04N 7/01* (2006.01)

(52) U.S. Cl.
 CPC ............... *H04N 5/144* (2013.01); *H04N 7/014* (2013.01)

(58) Field of Classification Search
 USPC .................. 375/240, 240.01, 240.02, 240.08, 375/240.12, 240.13, 240.14, 240.16, 240.18
 See application file for complete search history.

(56) References Cited

U.S. PATENT DOCUMENTS

| | | | | |
|---|---|---|---|---|
| 4,873,573 A | * | 10/1989 | Thomas et al. | 375/240.16 |
| 5,398,068 A | * | 3/1995 | Liu et al. | 375/240.16 |
| 5,696,848 A | * | 12/1997 | Patti et al. | 382/254 |
| 5,786,860 A | | 7/1998 | Kim et al. | |
| 6,240,211 B1 | * | 5/2001 | Mancuso et al. | 382/236 |
| 6,275,532 B1 | * | 8/2001 | Hibi et al. | 375/240.17 |
| 6,438,170 B1 | * | 8/2002 | Hackett et al. | 375/240.16 |
| 6,452,971 B1 | * | 9/2002 | Iwasaki et al. | 375/240.12 |
| 7,362,374 B2 | * | 4/2008 | Holt et al. | 348/446 |
| 2002/0041699 A1 | * | 4/2002 | Kim | 382/107 |
| 2003/0053543 A1 | * | 3/2003 | Bhaumik et al. | 375/240.16 |
| 2003/0091113 A1 | * | 5/2003 | Matsuura et al. | 375/240.16 |
| 2004/0146110 A1 | | 7/2004 | Bjontegaard | |
| 2005/0259878 A1 | * | 11/2005 | Drezner et al. | 382/236 |
| 2005/0281335 A1 | * | 12/2005 | Ha | 375/240.16 |
| 2006/0062306 A1 | * | 3/2006 | Ha et al. | 375/240.16 |
| 2006/0239353 A1 | * | 10/2006 | De Haan et al. | 375/240.16 |
| 2009/0096930 A1 | * | 4/2009 | Chen | 348/699 |

FOREIGN PATENT DOCUMENTS

| | | |
|---|---|---|
| EP | 1 592 258 A1 | 11/2005 |
| KR | 1999-76276 | 10/1999 |
| KR | 2001-37332 | 5/2001 |

(Continued)

*Primary Examiner* — Curtis A Alia
(74) *Attorney, Agent, or Firm* — Harness, Dickey & Pierce, P.L.C.

(57) ABSTRACT

A system and method of estimating a motion of an image using block sampling are provided. The motion estimation system includes: a block sampling unit to divide a frame of an input image into a plurality of blocks and sample the plurality of blocks based on a lattice structure; a first motion vector determination unit to determine a motion vector of a first current block using motion vectors of neighboring blocks of the first current block with respect to the sampled blocks; and a second motion vector determination unit to determine a motion vector of a second current block based on features of motion vectors of sampled neighboring blocks of the second current block wherein the second current block is not sampled.

21 Claims, 5 Drawing Sheets

(56) References Cited

FOREIGN PATENT DOCUMENTS

| KR | 2003-11325 | 2/2003 |
| KR | 2004-95398 | 11/2004 |
| KR | 2005-45192 | 5/2005 |
| KR | 10-2006-0025930 | 3/2006 |
| KR | 2006-25930 | 3/2006 |
| KR | 2006-89495 | 8/2006 |
| WO | WO 2006104366 A1 * | 10/2006 |

* cited by examiner

< EVEN FRAME >   < ODD FRAME >

SYSTEM AND METHOD OF ESTIMATING MOTION OF IMAGE USING BLOCK SAMPLING

CROSS-REFERENCE TO RELATED APPLICATION

This application claims the benefit of Korean Patent Application No. 2007-103196, filed on Oct. 12, 2007 in the Korean Intellectual Property Office, the disclosure of which is incorporated herein by reference.

BACKGROUND OF THE INVENTION

1. Field of the Invention

Aspects of the present invention relate to a system and method of estimating a motion of an image using block sampling, and more particularly, to a system and method of estimating a motion of an image which can estimate a motion of an image by classifying a sampled block and an unsampled block.

2. Description of the Related Art

A motion estimation scheme in a frame is generally used to improve a frame rate of an input image. The conventional motion estimation scheme can perform a motion estimation with respect to all blocks that are included in each frame of the input image. With developments in an image input/output system, the definition of an image also is improved. In the case of a high definition image, a computation complexity increases in the motion estimation process.

Specifically, in the case of the high definition image, a number of pixels to be processed increases and thereby a search region for motion estimation of each pixel also increases. Therefore, increases in pixels and search regions increase the computation complexity. For example, when applying the conventional motion estimation scheme to an image that represents an ultra definition (UD) of more than four times in comparison to a full high definition (FHD), the number of pixels and the size of search region can increase by more than four times respectively. Therefore, when the definition increases by more than four times, and in this state, the existing motion estimation algorithm is applied, a total amount of computation can increase by more than 16 times. A greater amount of time and efforts may be needed to process the computation.

Accordingly, there is a need for a method that can reduce an amount of computation, and can have high accuracy in a motion estimation process for converting a frame rate, when an input image is a high definition image.

SUMMARY OF THE INVENTION

Aspects of the present invention provide a motion estimation system and method that can sample blocks based on a lattice structure, and apply a motion estimation process with respect to a sampled block, and determine a motion vector using a motion vector of a neighboring block with respect to an unsampled block.

Other aspects of the present invention also provide a motion estimation system and method using block sampling that can perform a motion estimation with respect to a sampled block by using, as a candidate, a motion vector of a neighboring vector of the sampled block and thereby can reduce an amount of computation for the motion estimation.

Other aspects of the present invention also provide a motion estimation system and method using block sampling that can interpolate a motion vector of a current block using motion vectors of neighboring blocks of the current block, in a current frame and a previous frame, based on a grating structure that changes for each frame, with respect to an unsampled block and thereby can reduce a motion estimation error.

Other aspects of the present invention also provide a motion estimation system and method that can provide a fast and accurate motion estimation scheme and thereby can effectively improve an image frame rate.

According to an aspect of the present invention, there is provided a system for estimating a motion, including: a block sampling unit to divide a frame of an input image into a plurality of blocks and sample the plurality of blocks based on a lattice structure; a first motion vector determination unit to determine a motion vector of a first current block using motion vectors of neighboring blocks of the first current block with respect to the sampled blocks; and a second motion vector determination unit to determine a motion vector of a second current block based on features of motion vectors of sampled neighboring blocks of the second current block wherein the second current block is not sampled.

In an aspect of the present invention, the first motion vector determination unit may include: a motion estimation error computation unit to compute a motion estimation error using motion vectors of neighboring blocks of the first current block; and a decision type setting unit to compare the motion estimation error and a predetermined threshold value, and set a decision type of the motion vector of the first current block.

In an aspect of the present invention, the second motion vector determination unit may determine the motion vector of the second current block based on whether a determined motion vector from a search region exists in the motion vectors of the sampled blocks.

In an aspect of the present invention, when the determined motion vector from the search region does not exist in the motion vectors of the sampled blocks, the second motion vector determination unit may interpolate the motion vectors of neighboring blocks of the second current block, and determine the motion vector of the second current block.

According to another aspect of the present invention, there is provided a method of estimating a motion, including: dividing a frame of an input image into a plurality of blocks and sampling the plurality of blocks based on a lattice structure; determining a motion vector of a first current block using motion vectors of neighboring blocks of the first current block with respect to the sampled blocks; and determining a motion vector of a second current block based on features of motion vectors of sampled neighboring blocks of the second current block wherein the second current block is not sampled.

In an aspect of the present invention, the sampling may sample the plurality of blocks based on the lattice structure that changes for each of an odd frame and an even frame of the input image.

In an aspect of the present invention, when the motion estimation error is less than or equal to the threshold value, the setting may set the decision type as a type that uses motion vectors of neighboring blocks of the first current block.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
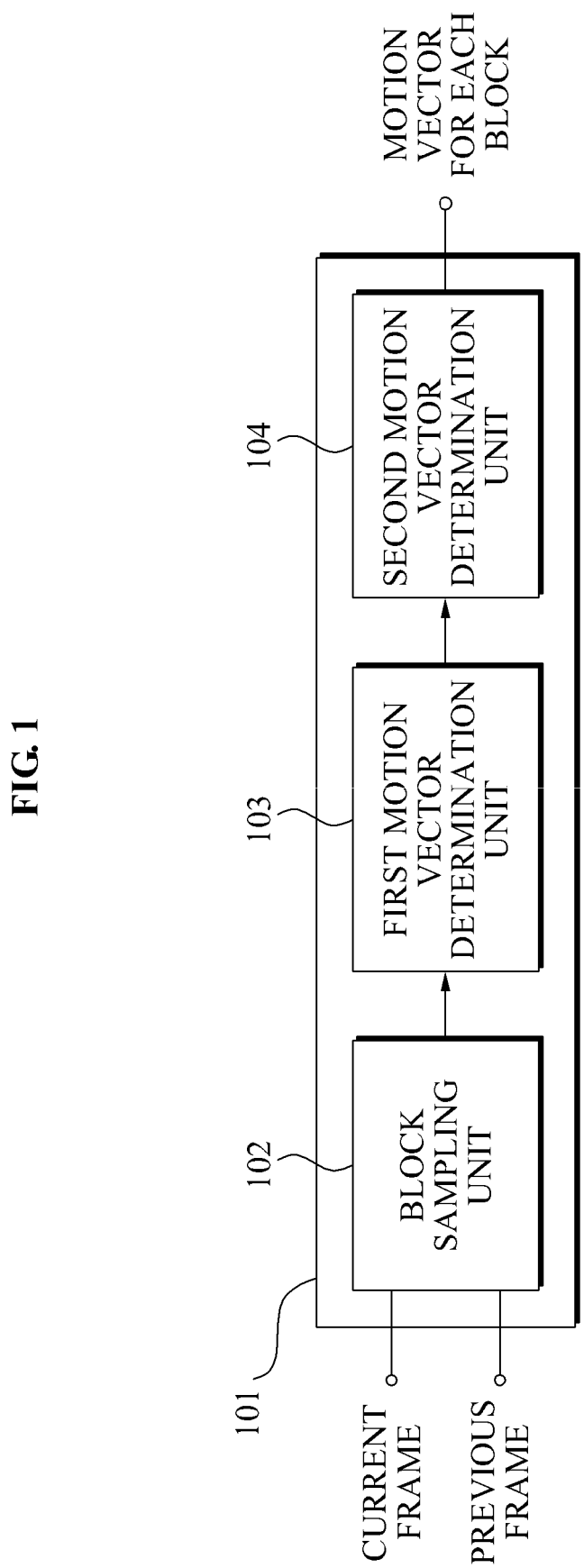
FIG. 1 is a block diagram illustrating a configuration of a motion estimation system using block sampling according to an aspect of the present invention.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

FIG. 1 is a block diagram illustrating a configuration of a motion estimation system 101 using block sampling according to an aspect of the present invention.

Referring to FIG. 1, the motion estimation system 101 includes a block sampling unit 102, a first motion vector determination unit 103, and a second motion vector determination unit 104. According to an aspect of the present invention, the motion estimation system 101 may be used to improve a frame rate of an image. More specifically, the frame rate of the image may be improved by determining a motion vector for each block included in each image frame, interpolating the determined motion vectors, and generating an additional intermediate frame using the motion estimation system 101.

The block sampling unit 102 may divide a frame of an input image into a plurality of blocks and sample the plurality of blocks based on a lattice structure. When sampling the plurality of blocks based on the lattice structure, about 25% of blocks may be sampled in comparison to when sampling the entire frame. Therefore, the entire amount of computation can be reduced. Specifically, even though the image definition is improved and thereby a number of pixels to be processed increases, the block sampling unit 102 performs a motion estimation for sampled blocks based on the lattice structure. When sampling the plurality of blocks based on the lattice structure, the number of pixels to be actually used is reduced to about one quarter of all pixels of the frame even though the image definition is improved. Therefore, the computation complexity may be reduced in the motion estimation.

For example, the block sampling unit 102 may sample the plurality of blocks based on the lattice structure that changes for each of an odd frame and an even frame of the input image. Even a block that is not sampled in the current frame can be sampled in a subsequent frame. Therefore, when interpolating a motion vector, accuracy may be improved. An operation of the block sampling unit 102 will be further described in detail with reference to FIG. 3.

The first motion vector determination unit 103 may determine a motion vector of a first current block using motion vectors of neighboring blocks of the first current block with respect to the sampled blocks. The first current block may be a block for which the motion estimation is being performed among blocks that are sampled in the current frame.

Specifically, the first motion vector determination unit 103 may compute a motion estimation error using motion vectors of neighboring blocks of the first current block. The motion estimation error may be referred to as a mean absolute difference (MAD).

The first motion vector determination unit 103 may compare the motion estimation error and a predetermined threshold value, and set a decision type of the motion vector of the first current block. Examples of the decision type may include a decision type that uses motion vectors of neighboring blocks of the first current block and another decision type that uses a search region. In the case of the decision type that uses the motion vectors of neighboring blocks of the first current block, the motion vector of the first current block may be determined by using a process of computing the motion estimation error as is. Therefore, an amount of computation needed for the motion estimation may be reduced. An operation of the first motion vector determination unit 103 will be further described in detail with reference to FIG. 4.

The second motion vector determination unit 104 may determine a motion vector of a second current block based on features of motion vectors of sampled neighboring blocks of the second current block. The second current block is not sampled. The second current block may be a block for which the motion estimation is being performed among blocks that are not sampled in the current frame. The sampled neighboring blocks of the second current block may be blocks of which motion vectors are determined using the first motion vector determination unit 103.

The second motion vector determination unit 104 may determine the motion vector of the second current block based on whether a determined motion vector from a search region exists in the motion vectors of the sampled neighboring blocks.

When the determined motion vector does not exist, it can be estimated that the sampled blocks have a relatively higher correlation with the second current block.

Accordingly, the second motion vector determination unit 104 may determine the motion vector of the unsampled second current block by interpolating motion vectors of sampled neighboring blocks. Specifically, it is possible to reduce an amount of computation by interpolating the motion vectors of neighboring blocks of the second current block through a simple computation process, without performing additional motion estimation.

Conversely, when the determined motion vector exists, it can be estimated that a block with a relatively greater possibility of including a boundary of an object exists among the sampled blocks. If simply interpolating the motion vector of the sampled neighboring block of the second current block, the determined motion vector of the second current block may output a large difference from an actual motion direction of a corresponding block.

Accordingly, in order to reduce the motion estimation error, the second motion vector determination unit 104 may determine the motion vector of the second current block by performing additional motion estimation using the motion vectors of neighboring blocks of the second current block. An operation of the second motion vector determination unit 104 will be further described in detail with reference to FIG. 5.

Figure 2:
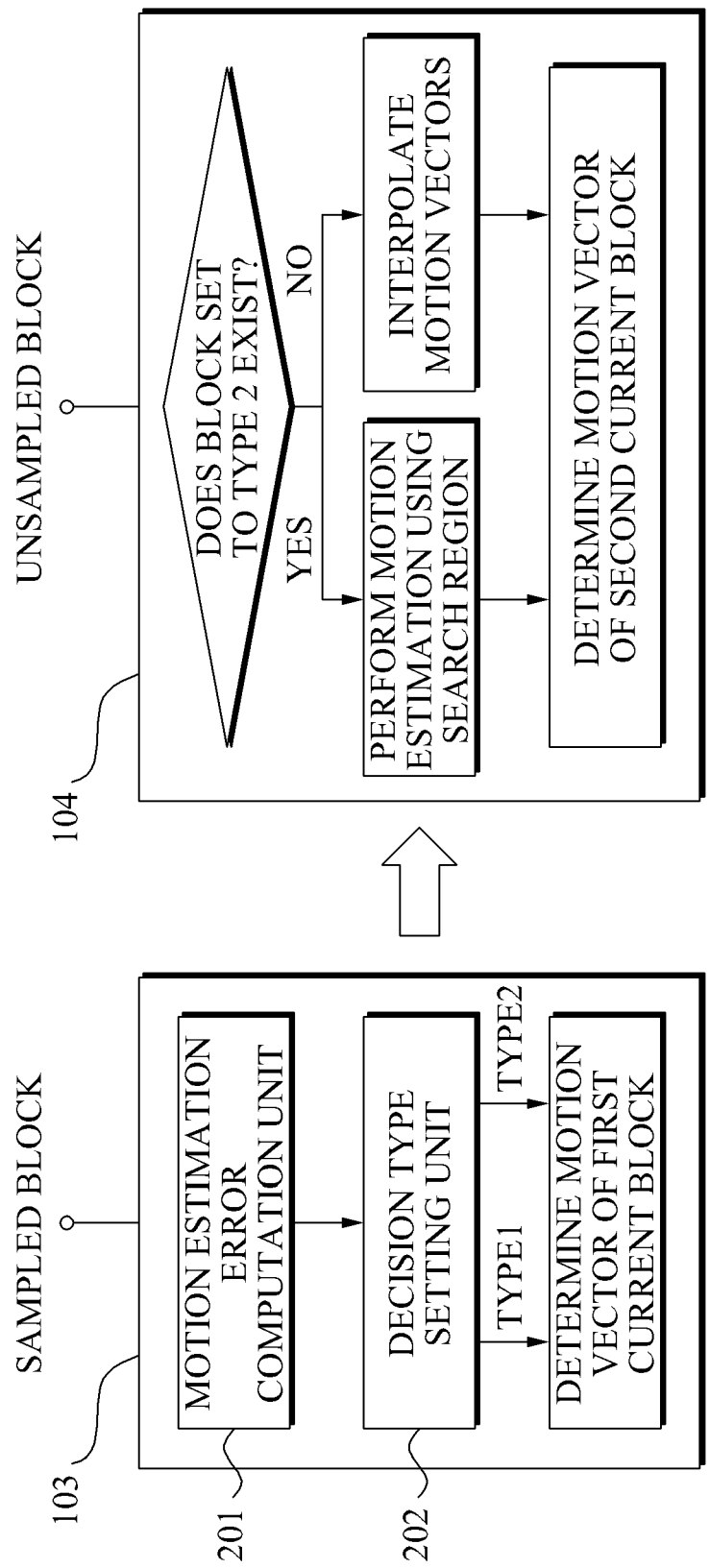
FIG. 2 illustrates an operation of a first motion vector determination unit and a second motion vector determination unit of a motion estimation system of FIG. 1, in detail.

FIG. 2 illustrates an operation of the first motion vector determination unit 103 and the second motion vector determination unit 104 of the motion estimation system 101 of FIG. 1, in detail.

Referring to FIG. 2, the first motion vector determination unit 103 may determine a motion vector with respect to a sampled block. The second motion vector determination unit 104 may determine a motion vector with respect to an unsampled block. As described above, the block sampling unit 101 may sample a plurality of blocks based on a lattice structure that changes for each of an odd frame and an even frame.

The first motion vector determination unit 103 may determine a motion vector of a first current block using motion vectors of neighboring blocks of the first current block with respect to the sampled blocks. Referring to FIG. 2, the first motion vector determination unit 103 may include a motion estimation error computation unit 201 and a decision type setting unit 202.

The motion estimation error computation unit 201 may compute a motion estimation error using motion vectors of neighboring blocks of the first current block. The motion estimation error computation unit 201 may compute the motion estimation error with respect to neighboring blocks of the first current block, instead of computing the motion estimation error with respect to blocks of the entire frame. Accordingly, it is possible to significantly reduce an amount of computation when computing the motion estimation error.

The motion estimation error may denote a value with a minimum MAD with respect to each MAD of neighboring blocks of the first current block. Specifically, the MAD may be the similarity between blocks within the search region. As the MAD becomes smaller, the neighboring block of the first current block may have a relatively higher correlation with the first current block. The MAD may be computed according to, $$MAD(i, j) = \frac{1}{MN}\sum_{m=1}^{M}\sum_{n=1}^{N}|I(m, n) - I(m + i, n + j)|,$$ [Equation 1]

where I denotes an image value for each pixel. For example, the motion estimation error computation unit 201 may compute the motion estimation error for each pixel with respect to the entire one block, starting from an upper left-side block. The correlation between the first current block and neighboring blocks of the first current block may be generally computed to be relatively large. Therefore, the neighboring blocks may be used when computing the motion estimation error. The neighboring blocks of the first current block may denote a block of which a motion vector is determined among the sampled blocks, before performing the motion estimation of the first current block. Locations of the first current block and neighboring blocks thereof will be described in detail with reference to FIG. 4.

The decision type setting unit 202 may compare the motion estimation error and a predetermined threshold value, and set a decision type of the motion vector of the first current block. For example, when the motion estimation error is less than or equal to the threshold value, the decision type setting unit 202 may set the decision type as a type that uses motion vectors of neighboring blocks of the first current block. Conversely, when the motion estimation error is greater than the threshold value, the decision type setting unit 202 may set the decision type as a type that uses a search region. Hereinafter, the decision type that uses the motion vectors of neighboring blocks of the first current block is referred to as TYPE 1 and the decision type that uses the search region is referred to as TYPE 2.

When the decision type is set to TYPE 1, it may indicate that the motion estimation error is less than or equal to the threshold value. Specifically, it is possible to estimate that the correlation between the first current block and sampled neighboring blocks of the first current block is high. Generally, blocks belonging to the same object in a frame must be the same motion vector.

Accordingly, the decision type of many sampled blocks in the frame may be generally set to TYPE 1. When the motion vector of the first current block is determined based on TYPE 1, the process of computing the motion estimation error may be used as is. Therefore, the computation may be more quickly performed.

When the motion vector of the first current block is determined using the motion vectors of neighboring blocks of the first current block, the correlation of the motion vector between blocks may be maintained and thereby effect of blocking artifact may be reduced. Also, it is not necessary to repeat the computation of MAD for finding the optimized motion within the search region. An amount of computation may be reduced by performing the motion estimation with respect to smaller neighboring blocks of the first current block.

Conversely, when the decision type is set to TYPE 2, it may indicate that the motion estimation error is greater than the threshold value. Specifically, it is possible to estimate the first current block as a block with a relatively higher possibility of including a boundary of an object where a new motion occurs. The first current block may be a block that has a different motion from sampled neighboring blocks of the first current block. When using the motion vectors of sampled neighboring blocks of the first current block as they are, the motion estimation error may be increased.

Accordingly, when the decision type is set to TYPE 2, the first motion vector determination unit 103 may determine the motion vector of the first current block using the search region. According to an aspect of the present invention, the search region may be set to a local region based on an initial value, using as the initial value a motion vector of a sampled neighboring block of the first current block. Specifically, when the motion vector of the first current block is determined by setting the local search region based on an initial motion vector value of the neighboring block, the spatial correlation between blocks may be maintained based on the initial motion vector value.

The search region may be set based on the neighboring blocks of the first current block and the size of the search region may change based on the size of the motion vector of the neighboring block. For example, as the size of the motion vector of the neighboring block of the first current block becomes smaller, the search region increases. Specifically, when the motion vector of the neighboring block of the first current block is small, it is possible to perform the motion estimation within the relatively wider search region and cope with a radical change in the motion vector.

Accordingly, the first motion vector determination unit 103 may perform the motion estimation based on the decision type, that is, either TYPE 1 or TYPE 2 that is set by the decision type setting unit 202, and thereby determine the motion vector of the first current block.

The second motion vector determination unit 104 may determine the motion vector of the second current block based on features of motion vectors of sampled neighboring blocks of the second current block. The second current block is not sampled. The features of motion vectors of the sampled neighboring blocks of the second current block denote which decision type the motion vector of the sampled blocks is determined as.

As shown in FIG. 2, according to the present invention, the second motion vector determination unit 104 may determine the motion vector of the second current block based on whether a determined motion vector from a search region exists in the motion vectors of the sampled blocks.

In an aspect of the present invention, when the determined motion vector from the search region does not exist in the motion vectors of the sampled blocks, the second motion vector determination unit 104 may interpolate the motion vectors of neighboring blocks of the second current block, and determine the motion vector of the second current block. Specifically, the entire motion vectors of the sampled neighboring blocks of the second current block are determined as TYPE 1 by the first motion vector determination unit 103.

When the motion vector determined as TYPE 2 does not exist in the motion vectors of neighboring blocks of the second current block, it may be highly probable that the neighboring blocks and the second current block may be included in the object with the same motion vector. Accordingly, it is possible to determine the motion vector of the second current block by interpolating the motion vectors of the sampled neighboring blocks of the second current block, without applying additional motion estimation process. A process of interpolating the motion vectors will be described in detail with reference to FIG. 5.

Conversely, when the motion vector determined from the search region exists in the motion vectors of the sampled blocks, the second motion vector determination unit 104 may perform additional motion estimation using the motion vectors of neighboring blocks of the second current block and thereby determine the motion vector of the second current block.

Specifically, when the determined motion vector from the search region exists in the motion blocks of the sampled blocks, it may be highly probable that a block with a relatively higher probability of including a boundary of an object where other motion occurs may exist in the neighboring blocks of the second current block. In this case, if determining the motion vector of the second current block by interpolating the motion vectors of the neighboring blocks of the second current block, a large error may occur in the results of the motion estimation. Therefore, the second motion vector determination unit 104 may determine the motion vector by performing additional motion estimation process, and thereby improve the motion estimation accuracy.

Figure 3:
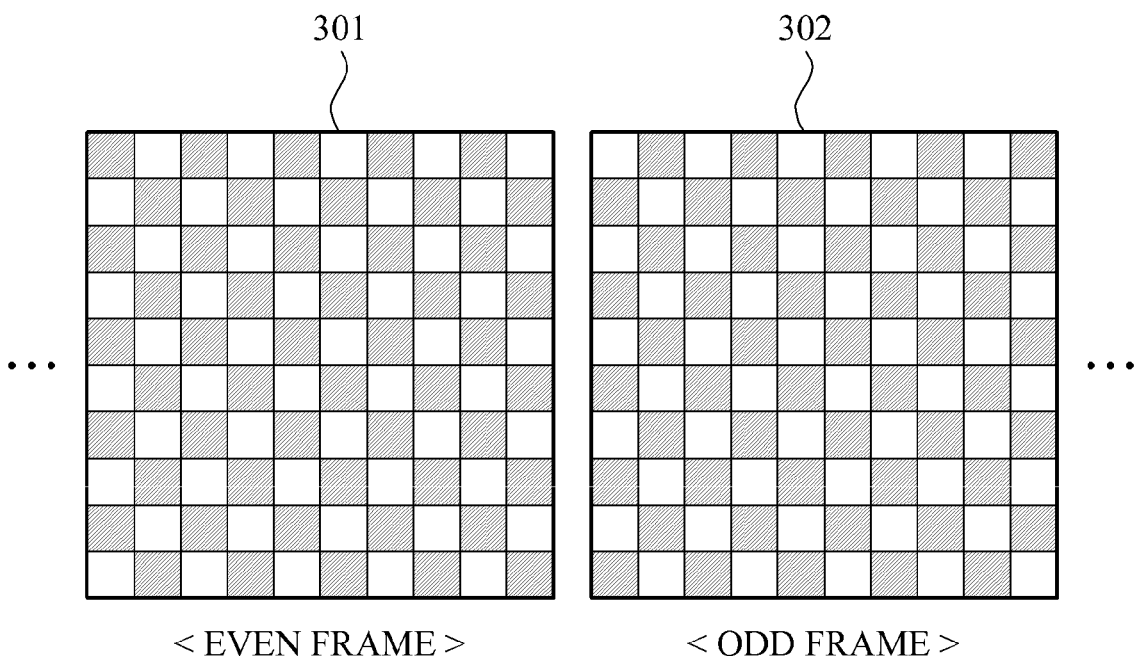
FIG. 3 illustrates a process of sampling a plurality of blocks based on a lattice structure that changes for each of an odd frame and an even frame according to an aspect o of the present invention.

FIG. 3 illustrates a process of sampling a plurality of blocks based on a lattice structure that changes for each of an even frame 301 and an odd frame 302 according to an aspect o of the present invention.

As described above, the block sampling unit 102 may divide a frame of an input image into a plurality of blocks and sample the plurality of blocks based on the lattice structure. By sampling the entire frame using the lattice structure, the block sampling unit 102 may reduce an amount of computation needed for the motion estimation to one quarter in comparison to when sampling all the blocks included in the frame.

For example, the block sampling unit 102 may sample the plurality of blocks based on the lattice structure. The lattice structure changes for each of the even frame 301 and the odd frame 302 of the input image. Referring to FIG. 3, the even frame 301 and the odd frame 302 have a different lattice structure. For example, the block sampling unit 102 may sample the plurality of blocks included in the even frame 301 according to, $$B_{ij} = \begin{cases} ON, & \text{if } (i = \text{even} \ \& \ j = \text{even}) \text{ or } (i = \text{odd} \ \& \ j = \text{odd}) \\ OFF, & \text{otherwise} \end{cases}, \quad \text{[Equation 2]}$$

where i denotes coordinates of the x axis and j denotes coordinates of the y axis in a block. Specifically, the block sampling unit 102 may sample a block of corresponding coordinates when coordinates of the x and y axes are both even number with respect to the even frame 301, such as (0, 0), (0, 2), (2, 0), (2, 4), and the like. Conversely, the block sampling unit 102 may sample the block of corresponding coordinates when coordinates of the x and y axes are both odd number with respect to the odd frame 302, such as (1, 1), (1, 7), (3, 5), and the like. Due to the lattice structure that changes for each frame, the block of the same location may be sampled or not sampled.

As described above, the lattice structure changes depending on whether the frame is either the even frame 301 or the odd frame 302. Therefore, the number of neighboring blocks of the second current block, which are available for interpolation of the second motion vector determination unit 104, increases. Also, the reliability in the motion estimation may be improved.

Figure 4:
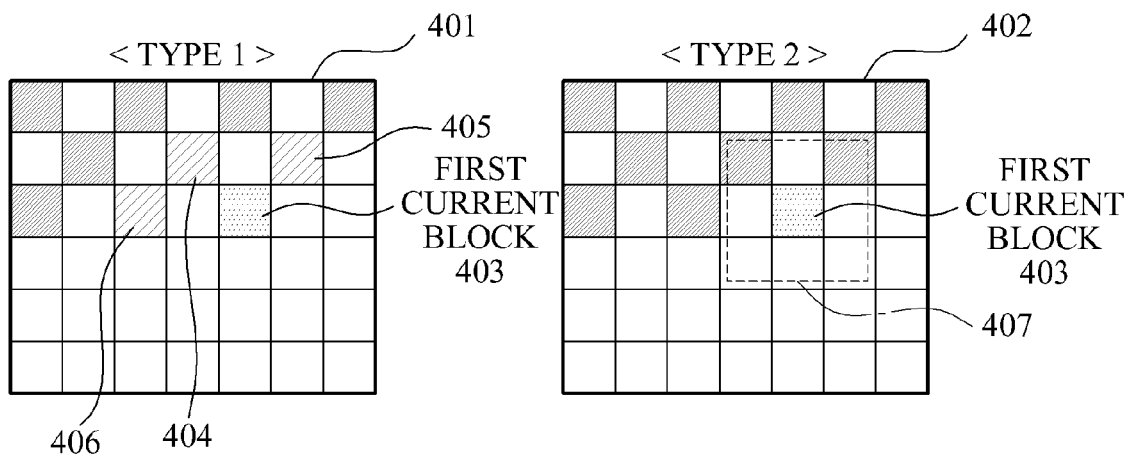
FIG. 4 illustrates a decision type with respect to a motion vector of a first current block according to an aspect of the present invention.

FIG. 4 illustrates a decision type with respect to a motion vector of a first current block 403 according to an aspect of the present invention.

The motion estimation error computation unit 201 may compute a motion estimation error using motion vectors of sampled neighboring blocks 404, 405, and 406 of the first current block 403. The sampled neighboring blocks 404, 405 and 406 have a relatively higher correlation with the first current block 403 and thus can be used when the motion estimation error computation unit 201 computes the motion estimation error. A location and a number of sampled blocks that are used to determine the motion vector of the first current block 403 is not limited.

Referring to FIG. 4, a decision type of a frame 401 with respect to the motion vector is set to TYPE 1 and a decision type of a frame 402 with respect to the motion vector is set to TYPE 2.

When the decision type is set to TYPE 1, the first motion vector determination unit 201 may determine the motion vector of the first current block 403 using the motion vectors of the sampled neighboring blocks 404, 405, and 406 of the first current block 403. When the decision type is set to TYPE 1, the first motion vector determination unit 201 may determine the motion vector of the first current block 403 according to, $$MV_c = \arg\min MAD(MV_i), \quad \text{[Equation 3]}$$

where i=1, 2, 3, $MV_c$ denotes the first current block 403 and $MV_i$ denotes the sampled neighboring blocks 404, 405, and 406 of the first current block 403 and changes depending on i. Specifically, the first motion vector determination unit 403 may determine as the motion vector of the first current block 403 a motion vector of a block with minimum MAD.

When the decision type is set to TYPE 2, the first motion vector determination unit 201 may determine the motion vector of the first current block 403 using a search region 407.

When the decision type is set to TYPE 2, the first motion vector determination unit 201 may determine the motion vector of the first current block 403 according to, $$MV_c = \mathrm{argmin} MAD(MV_i + A), \quad \text{[Equation 4]}$$

where i=1, 2, 3, $MV_c$ denotes the first current block 403 and $MV_i$ denotes the sampled neighboring blocks 404, 405, and 406 of the first current block 403 and changes depending on i. A denotes a local search region that is set based on any one of the sampled blocks 404, 405, and 406. According to an aspect of the present invention, the search region 407 is set based on any one of the sampled neighboring blocks 404, 405, and 406 of the first current block 403. Therefore, the spatial correlation between the first current block 403 and the blocks 404, 405, and 406 may be maintained.

The size of the search region 407 may change based on the size of a motion vector of any one of the blocks 404, 405, and 406. As described above, as the size of the motion vector becomes smaller, the size of the search region 407 may be set to be large. Specifically, as the size of the motion vectors of the blocks 404, 405, and 406 becomes smaller, the size of A may increase.

When the decision type is set to TYPE 2, the first motion vector determination unit 103 may determine as the motion vector of the first current block 403 the motion vector of the block with the minimum MAD.

Figure 5:
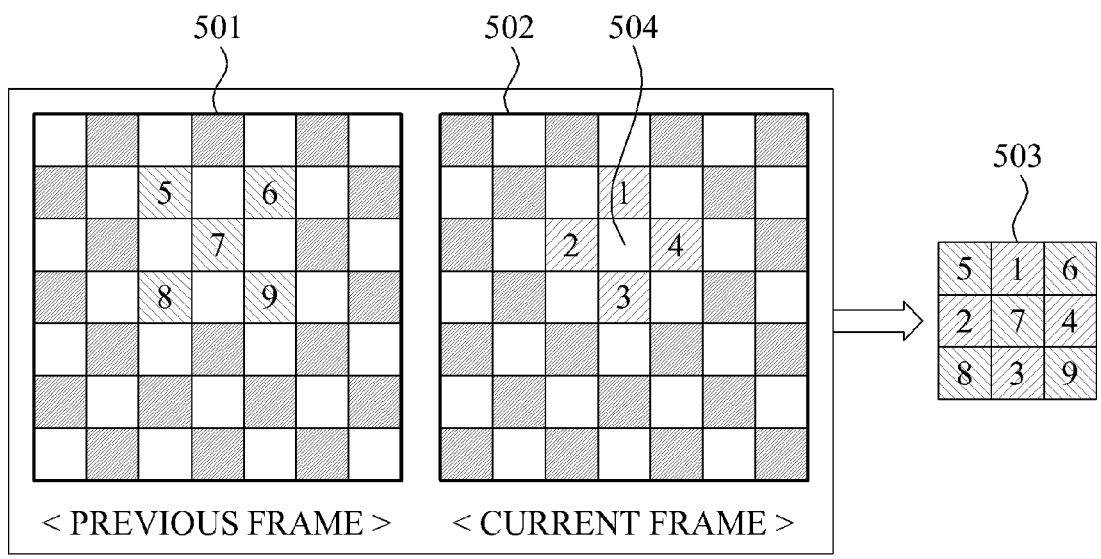
FIG. 5 illustrates a process of determining a motion vector of a second current block by interpolating motion vectors of neighboring blocks according to an aspect of the present invention.

FIG. 5 illustrates a process of determining a motion vector of a second current block 504 by interpolating motion vectors of neighboring blocks according to an aspect of the present invention.

Referring to FIG. 5, a current frame 501 and a previous frame 502 are provided. The second motion vector determination unit 104 may determine a motion vector of the second current block 504 based on features of motion vectors of sampled neighboring blocks of the unsampled second current block 504. The second motion vector determination unit 104 may determine the motion vector of the second current block 504 based on whether a motion vector determined from a search region exists in the motion vectors of the sampled blocks.

For example, whether the determined motion vector from the search region exists in the motion vectors of the sampled blocks may be determined using neighboring blocks of the second current block 504 that is unsampled in the current frame 502. The neighboring blocks of the unsampled second current block 504 in the current frame 502 are blocks 1, 2, 3, and 4. Specifically, the blocks 1, 2, 3, and 4 are sampled blocks that motion vectors thereof are already determined.

When the motion vector of any one of the blocks 1, 2, 3, and 4 is determined based on TYPE 2, the second motion vector determination unit 104 may determine the motion vector of the second current block 504 by applying additional motion estimation. Specifically, when the motion vector of any one of the blocks 1, 2, 3, and 4 is determined based on TYPE 2, it may be highly probable that a block with a relatively higher probability of including a boundary of an object may exist.

When the motion vector of any one of the blocks 1, 2, 3, and 4 is not determined based on TYPE 2, the second motion vector determination unit 104 may interpolate motion vectors of neighboring blocks of the second current block 504 and thereby determine the motion vector of the second current block 504.

For example, the second motion vector determination unit 104 may interpolate the motion vectors of the blocks 1, 2, 3, and 4 in the current frame 502 and also interpolate motion vectors of blocks 5, 6, 7, 8, and 9 in the previous frame 501 and thereby determine the motion vector of the second current block 504. A frame 503 of FIG. 5 includes temporal and spatial neighboring blocks of the second current block 504 that are used to determine the motion vector of the second current block 504.

For example, the second motion vector determination unit 104 may average and interpolate the motion vectors of neighboring blocks of the second current block in a current frame, and the motion vectors of neighboring blocks of the second current block in a previous frame, based on a weight. The second motion vector determination unit 104 may perform interpolation according to, $$MV_c = \frac{\omega_1 \cdot MV_1 + \omega_2 \cdot MV_2 + \ldots + \omega_8 \cdot MV_8 + \omega_9 \cdot MV_9}{\omega_T}, \quad \text{[Equation 5]}$$

where $MV_c$ denotes the second current block 504 and $MV_{1\sim9}$ denotes the motion vector of each block. $\omega_{1\sim4}$ denotes a weight of each neighboring block of the second current block 504 in the current frame 502, $\omega_{5\sim9}$ denotes a weight of each neighboring block of the second current block 504 in the previous frame 501, and $\omega_T$ denotes the sum of weights.

Since the block sampling unit 102 samples the plurality of blocks based on the lattice structure that changes for each of an odd frame and an even frame, a block in the same location in the previous frame 501 may be sampled even though the second current block 504 is not sampled in the current frame 502. Specifically, the motion vector of the unsampled second current block 504 may be determined by interpolating the sampled block of the same location. Therefore, the reliability of the motion estimation may be improved.

Figure 6:
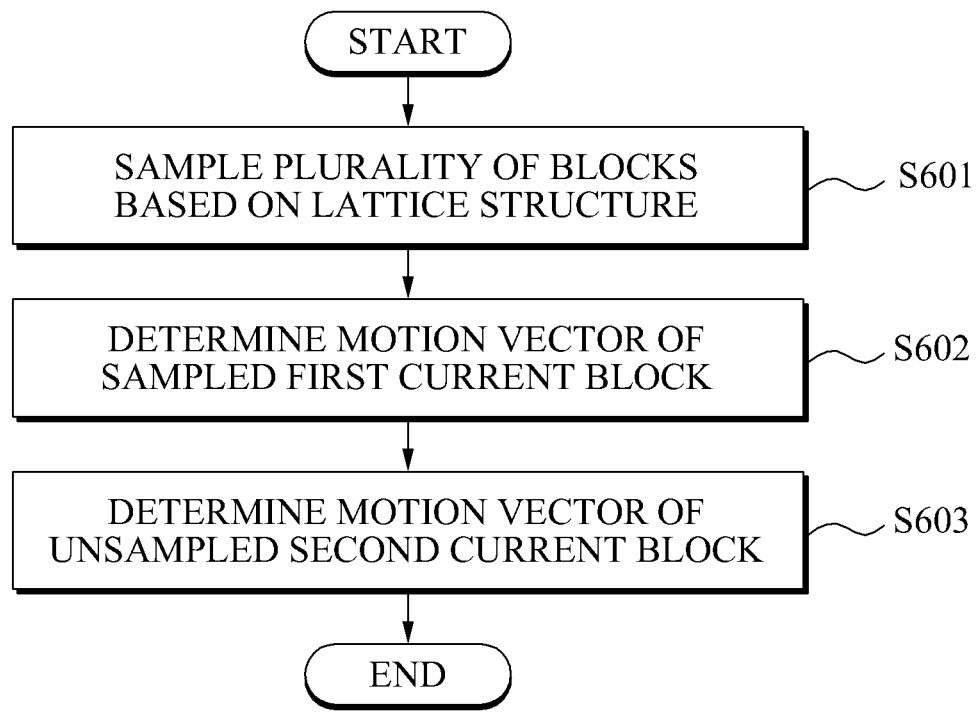
FIG. 6 is a flowchart illustrating a method of estimating a motion using block sampling according to an aspect of the present invention.

FIG. 6 is a flowchart illustrating a method of estimating a motion using block sampling according to an aspect of the present invention.

In operation S601, the motion estimation method divides a frame of an input image into a plurality of blocks and samples the plurality of blocks based on a lattice structure.

According to an aspect of the present invention, in operation S601, the motion estimation method may sample the plurality of blocks based on the lattice structure that changes for each of an odd frame and an even frame of the input image.

In operation S602, the motion estimation method determines a motion vector of a first current block using motion vectors of neighboring blocks of the first current block with respect to the sampled blocks.

According to an aspect of the present invention, operation S602 may include computing a motion estimation error using motion vectors of neighboring blocks of the first current block, and comparing the motion estimation error and a predetermined threshold value, and setting a decision type of the motion vector of the first current block.

According to an aspect of the present invention, when the motion estimation error is less than or equal to the threshold value, the motion estimation method may set the decision type as a type that uses motion vectors of neighboring blocks of the first current block in operation S602.

According to an aspect of the present invention, when the motion estimation error is greater than the threshold value, the decision type may be set as a type that uses a search region in operation S602.

The search region may be set based on a neighboring block of the first current block. The size of the search region may change based on the size of a motion vector of the neighbor block.

In operation S603, the motion estimation method may determine a motion vector of a second current block based on features of motion vectors of sampled neighboring blocks of the unsampled second current block.

According to an aspect of the present invention, the motion estimation method may determine the motion vector of the second current block based on whether a determined motion vector from a search region exists in the motion vectors of the sampled blocks in operation S603.

According to an aspect of the present invention, when the determined motion vector from the search region does not exist in the motion vectors of the sampled blocks, the motion estimation method may interpolate the motion vectors of neighboring blocks of the second current block, and determine the motion vector of the second current block in operation S603.

According to an aspect of the present invention, the motion estimation method may average and interpolate the motion vectors of neighboring blocks of the second current block in a current frame, and the motion vectors of blocks that neighbor the current blocks in a previous frame, based on a weight in operation S603.

The weight may change based on the direction and size of motion vectors of neighboring blocks of the second current block.

According to an aspect of the present invention, when the determined motion vector through the search region exists in the motion vectors of the sampled blocks, the motion estimation method may apply a motion estimation based on the search region and determine the motion vector of the second current block in operation S603.

Descriptions not made related to operations of FIG. 6 will be the same as described above with reference to FIGS. 1 through 5 and thus will be omitted here.

Aspects of the present invention can also be embodied as computer-readable codes on a computer-readable recording medium and can be realized in a common digital computer executing the program using a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and a computer data signal embodied in a carrier wave comprising a compression source code segment and an encryption source code segment (such as data transmission through the Internet). The computer-readable recording medium can also be distributed over network coupled computer systems so that the computer-readable code is stored and executed in a distributed fashion. Moreover, the hard disk drive can be used with a computer, can be a portable drive, and/or can be used with a media player.

According to aspects of the present invention, there may be provided a motion estimation system and method that can sample blocks based on a lattice structure, and apply a motion estimation process with respect to a sampled block, and determine a motion vector of a neighboring block with respect to an unsampled block.

Also, according to aspects of the present invention, there may be provided a motion estimation system and method using block sampling that can perform a motion estimation with respect to a sampled block by using, as a candidate, a motion vector of a neighboring vector of the sampled block and thereby can reduce an amount of computation for the motion estimation.

Also, according to aspects of the present invention, there may be provided a motion estimation system and method using block sampling that can interpolate a motion vector of a current block using motion vectors of neighboring blocks of the current block, in a current frame and a previous frame, based on a grating structure that changes for each frame, with respect to an unsampled block and thereby can reduce a motion estimation error.

Also, according to aspects of the present invention, there may be provided a motion estimation system and method that can provide a fast and accurate motion estimation scheme and thereby can effectively improve an image frame rate.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A system for estimating a motion, comprising:
a block sampling device to sample a plurality of blocks in a frame of an input image;
a first motion vector determination device to set a decision type of a motion vector of a first current block, and determine a motion vector of the first current block based on the decision type, wherein the first current block is selected among the sampled blocks; and
a second motion vector determination device to determine a motion vector of a second current block based on the decision type of motion vectors of neighboring sampled blocks of the second current block, wherein the second current block is selected among blocks that are not sampled,
wherein the decision type comprises a first type that uses at least one of motion vectors of neighboring blocks of the first current block and a second type that uses a search region to determine the motion vector of the first current block, and
the second motion vector determination device is configured to determine the motion vector of the second current block based on whether a motion vector determined based on the second type exists in the motion vectors of the neighboring sampled blocks of the second current block.

2. The system of claim 1, wherein the block sampling device samples the plurality of blocks based on a lattice structure that changes for each of an odd frame and an even frame of the input image.

3. The system of claim 1, wherein the first motion vector determination device further comprises:
a motion estimation error computation device to compute a motion estimation error using the at least one of motion vectors of the neighboring blocks of the first current block; and
device decision type setting device to compare the motion estimation error with a threshold value, and set the decision type of the motion vector of the first current block.

4. The system of claim 3, wherein when the motion estimation error is less than or equal to the threshold value, the decision type setting device sets the decision type as the first type.

5. The system of claim 3, wherein when the motion estimation error is greater than the threshold value, the decision type setting device sets the decision type as the second type.

6. The system of claim 1, wherein the search region is set based on a neighboring block of the first current block and the size of the search region changes based on the size of a motion vector of the neighboring block.

7. The system of claim 1, wherein when the motion vector determined based on the second type exists in the motion vectors of the neighboring sampled blocks of the second current block, the second motion vector determination device applies a motion estimation based on the search region and determines the motion vector of the second current block.

8. A system for estimating a motion, comprising:
a block sampling device to sample a plurality of blocks in a frame of an input image;
a first motion vector determination device to set a decision type of a motion vector of a first current block, and determine a motion vector of the first current block based on the decision type, wherein the first current block is selected among the sampled blocks; and
a second motion vector determination device to determine a motion vector of a second current block based on the decision type of motion vectors of neighboring sampled blocks of the second current block, wherein the second current block is selected among blocks that are not sampled,
wherein the decision type comprises a first type that uses at least one of motion vectors of neighboring blocks of the first current block and a second type that uses a search region to determine the motion vector of the first current block, and
when the motion vector determined based on the second type does not exist in the motion vectors of the neighboring sampled blocks of the second current block, the second motion vector determination device interpolates the motion vectors of neighboring blocks of the second current block, and determines the motion vector of the second current block.

9. The system of claim 8, wherein the second motion vector determination device averages and interpolates the motion vectors of neighboring blocks of the second current block in a current frame, and the motion vectors of neighboring blocks of the second current block in a previous frame, based on a weight.

10. The system of claim 9, wherein the weight changes based on the direction and size of the motion vectors of the neighboring blocks of the second current block.

11. A method of estimating a motion, comprising:
sampling a plurality of blocks in a frame of an input image;
setting a decision type of a motion vector of a first current block;
determining a motion vector of the first current block based on the decision type, wherein the first current block is selected among the sampled blocks; and
determining a motion vector of a second current block based on the decision type of motion vectors of neighboring sampled blocks of the second current block, wherein the second current block is selected among blocks that are not sampled,
wherein the decision type comprises a first type that uses at least one of motion vectors of neighboring blocks of the first current block and a second type that uses a search region to determine the motion vector of the first current block, and
the determining of the motion vector of the second current block is configured to determine the motion vector of the second current block based on whether a motion vector determined based on the second type exists in the motion vectors of the neighboring sampled blocks of the second current block.

12. The method of claim 11, wherein the sampling samples the plurality of blocks based on a lattice structure that changes for each of an odd frame and an even frame of the input image.

13. The method of claim 11, wherein the setting the decision type of the motion vector of the first current block further comprises:
computing a motion estimation error using the at least one of motion vectors of the neighboring blocks of the first current block;
comparing the motion estimation error with a threshold value; and
setting the decision type of the motion vector of the first current block based on a result of the comparing.

14. The method of claim 13, wherein when the motion estimation error is less than or equal to the threshold value, the setting sets the decision type as the first type.

15. The method of claim 13, wherein when the motion estimation error is greater than the threshold value, the setting sets the decision type as the second type.

16. The method of claim 11, wherein the search region is set based on a neighboring block of the first current block and the size of the search region changes based on the size of a motion vector of the neighboring block.

17. The method of claim 11, wherein, when the motion vector determined based on the second type does not exist in the motion vectors of the neighboring sampled blocks of the second current block, the determining of the motion vector of the second current block interpolates the motion vectors of neighboring blocks of the second current block, and determines the motion vector of the second current block.

18. The method of claim 17, wherein the determining of the motion vector of the second current block averages and interpolates the motion vectors of neighboring blocks of the second current block in a current frame, and the motion vectors of neighboring blocks of the second current block in a previous frame, based on a weight.

19. The method of claim 18, wherein the weight changes based on the direction and size of the motion vectors of the neighboring blocks of the second current block.

20. The method of claim 11, wherein when the motion vector determined based on the second type exists in the motion vectors of the neighboring sampled blocks of the second current block, the determining of the motion vector of the second current block applies a motion estimation based on the search region and determines the motion vector of the second current block.

21. A non-transitory computer-readable recording medium storing a program for implementing the method of claim 11.

* * * * *